US008041661B2

(12) United States Patent
Curtis

(10) Patent No.: US 8,041,661 B2
(45) Date of Patent: Oct. 18, 2011

(54) SYSTEM AND METHOD FOR DETERMINING STABILITY OF A NEURAL SYSTEM

(75) Inventor: Steven A. Curtis, Dayton, MD (US)

(73) Assignee: The United States of America as represented by the Administrator of the National aeronautics and Space Administration, Washington, DC (US)

( * ) Notice: Subject to any disclaimer, the term of this patent is extended or adjusted under 35 U.S.C. 154(b) by 922 days.

(21) Appl. No.: 11/861,687

(22) Filed: Sep. 26, 2007

(65) Prior Publication Data
US 2009/0083201 A1 Mar. 26, 2009

(51) Int. Cl.
*G06E 1/00* (2006.01)
*G06E 3/00* (2006.01)
(52) U.S. Cl. ............... 706/15; 706/16; 706/19
(58) Field of Classification Search .......... None
See application file for complete search history.

(56) References Cited

OTHER PUBLICATIONS

Doebbler et al., J., "Improved Adaptive-Reinforcement Learning Control for Morphing Unmanned Air Vehicles", Infoteach@Aerospace, pp. 1-19, Sep. 26-29, 2005.*
Horng, J., "Neural adaptive tracking control of a DC motor", Information Sciences 118, pp. 1-13, 1999.*
Valasek et al., J., "A Reinforcement Learning—Adaptive Control Architecture for Morphing", Journal of Aerospace Computing, Information, and Communication vol. 2, pp. 174-195, Apr. 2005.*
Mills et al., F., "Intelligent Agents—Belief, Desire, and Intentions Framework Implementation Using LORA", Decision Line, pp. 16-25, Mar. 2004.*
Mills et al., F., "Intelligent Agents—Belief, Desire, & Intent Framework Using LORA: A Program Independent Approach", Business Research Yearbook: Global Business Perspectives vol. XIII, pp. 280-285, 2006.*
Negnevitsky et al., M., "Accelerated Learning in Multi-Layer Neural Networks", IEEE, pp. 1167-1171, 1999.*

* cited by examiner

*Primary Examiner* — Michael B. Holmes
*Assistant Examiner* — Adrian Kennedy
(74) *Attorney, Agent, or Firm* — Matthew Johnston

(57) ABSTRACT

Disclosed are methods, systems, and computer-readable media for determining stability of a neural system. The method includes tracking a function world line of an N element neural system within at least one behavioral space, determining whether the tracking function world line is approaching a psychological stability surface, and implementing a quantitative solution that corrects instability if the tracked function world line is approaching the psychological stability surface.

6 Claims, 5 Drawing Sheets

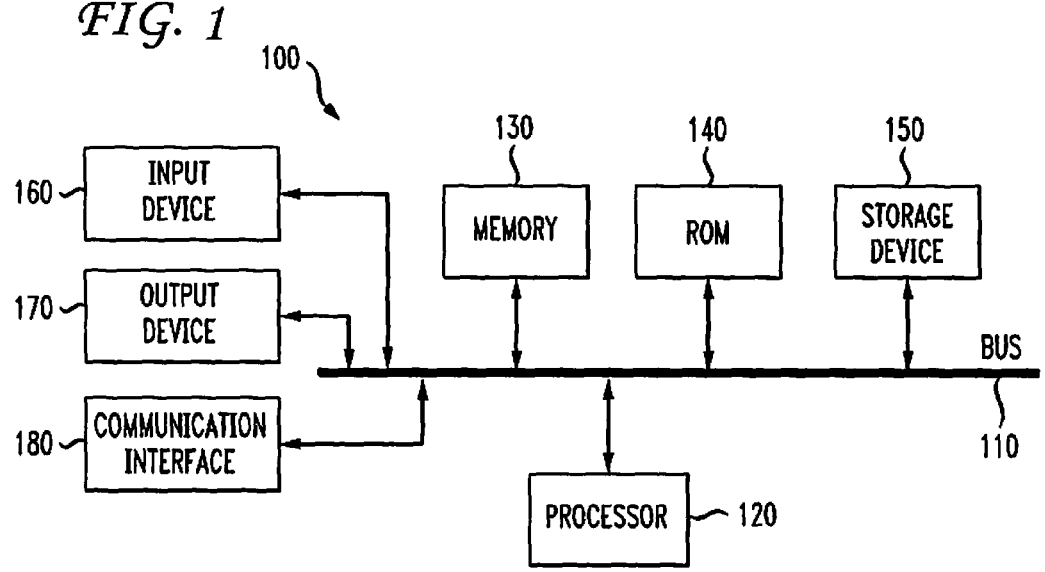
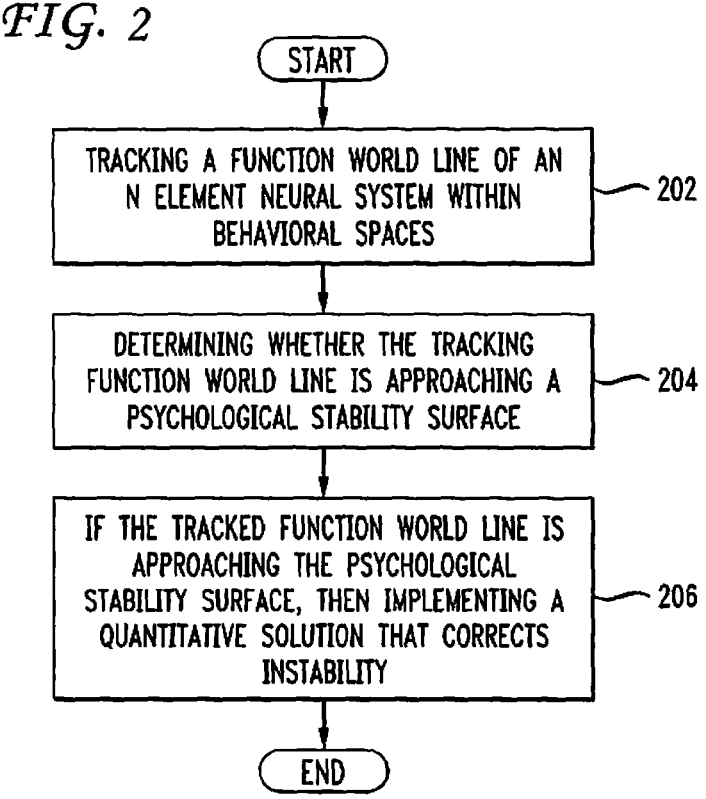

STABLE AND UNSTABLE TRAJECTORIES DEPENDING ON THE PSV, f

FIG. 5

BEHAVIORAL FUNCTION (BF) DEPENDENCE ON f (PSV), AN EMPIRICAL EXAMPLE.

$$F = \frac{\alpha f}{1 + f^{-n}}$$

WHERE $\alpha$ IS A PROPORTIONALITY CONSTANT AND $n \gg 1$ WITH THE PSS DEFINED AS $f = 1$.

HENCE FOR $f > 1$ $\quad F \approx \alpha f$ (LINEAR RESPONSE)

FOR $f < 1$ $\quad F \approx \alpha f^{n+1}$ (RAPID POWER LAW DECLINE)

FOR MAP TO BEHAVIORAL DIMENSIONS $\quad P = \alpha_P F, \; R = \alpha_R F, \; SC = \alpha_{SC} F$ SIMILARLY FOR PERTURBATIONS $\Delta\varepsilon$ (EXTERNAL) OR $\Delta i$ (INTERNAL)

$\quad \Delta\varepsilon = \alpha_\varepsilon F, \; \Delta i = \alpha_i F$

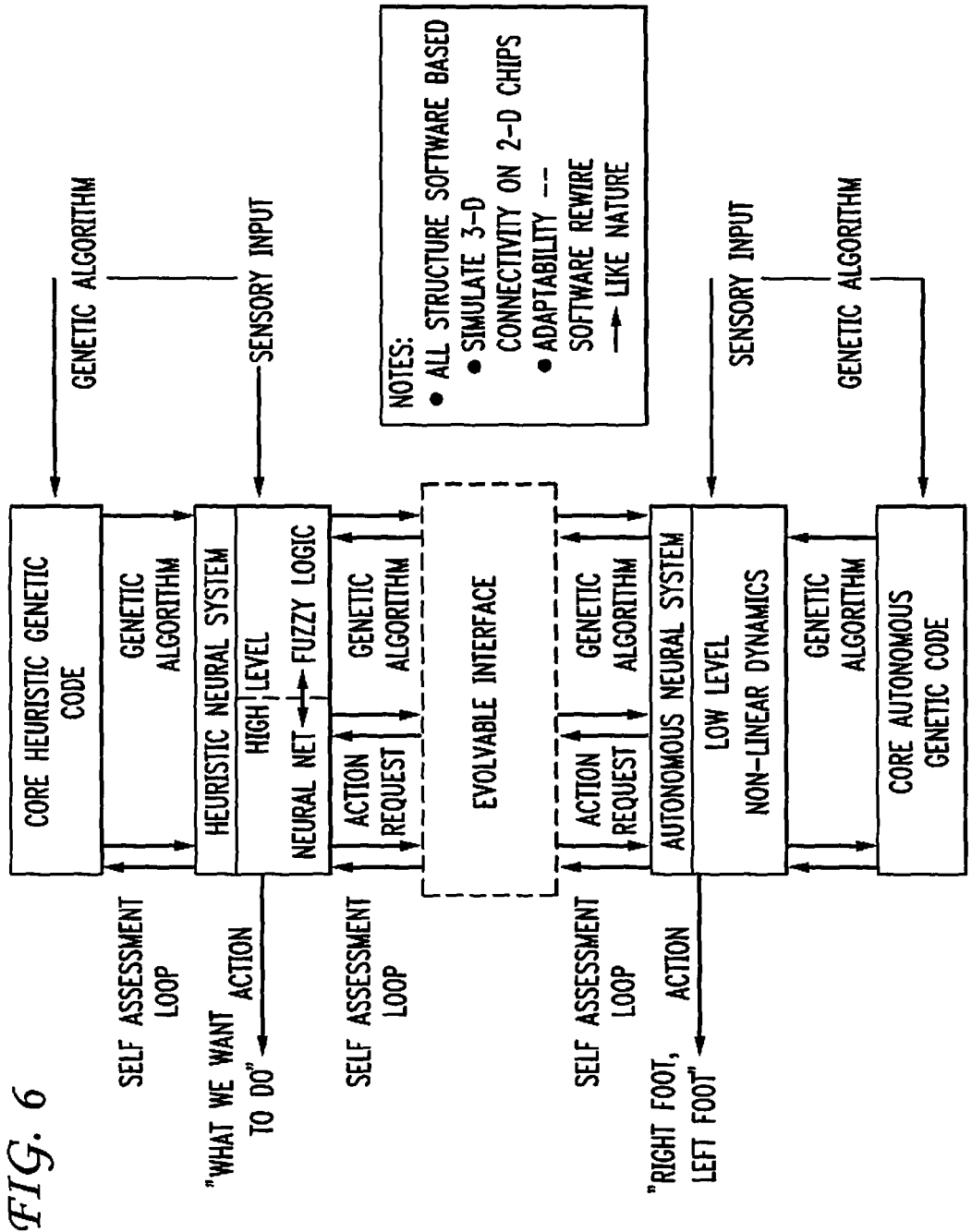

FIG. 7

EXAMPLE SANE TIME EVOLUTION OF PSV $$\frac{d}{dt}(\underline{PSV}) = \frac{d}{dt}\underline{\underline{PM}} \cdot \underline{PPV} + \frac{\partial}{\partial t}(\underline{PSV})$$

to first order:

$$\frac{d}{dt}f_k = \frac{\partial f}{\partial x_k}\left(\delta_{kj} + \frac{\partial x_k}{\partial x_j}(1-\delta_{kj})\right)\frac{\partial x_j}{\partial y_\ell}\frac{\partial y_\ell}{\partial t}$$

$$+ \frac{\partial f}{\partial x_k}\left(\delta_{kj} + \frac{\partial x_k}{\partial x_j}(1-\delta_{kj})\right)\partial x_j/\partial t$$

$$\text{WHERE} \quad \underline{PSV} \equiv \underline{f} = \begin{pmatrix} f_1 \\ \vdots \\ f_k \\ \vdots \\ f_N \end{pmatrix}, \quad \underline{PPV} = \begin{pmatrix} y_1 \\ y_2 \end{pmatrix}$$

$y_1$ = EXTERNAL PERTURBATIONS $y_2$ = INTERNAL PERTURBATIONS

AND $f = f(x_1, ..., x_k, ... x_N, y_1, y_2, t)$

WITH CHARACTERISTIC TIME SCALES:

$\tau_{REACTIVE} \ll \tau_{ADAPTATION} \ll \tau_{EVOLUTION}$
(PERTURBATION)

for $t \sim \tau_{REACTIVE}$ $\quad \frac{d}{dt}\underline{PSV} = \frac{d}{dt}\underline{\underline{PM}} \cdot \underline{PPV}$

SYSTEM AND METHOD FOR DETERMINING STABILITY OF A NEURAL SYSTEM

ORIGIN OF THE INVENTION

The invention described herein was made by employees of the United States Government and may be manufactured and used by or for the Government for governmental purposes without the payment of any royalties thereon or therefor.

BACKGROUND

1. Field of the Invention

The invention relates generally to neural systems, and more specifically, to determining the stability of synthetic, natural, or mixed neural systems in the context of a behavioral hyper space.

2. Introduction

Neural systems are mathematical or computational models consisting of an interconnected group of nodes, otherwise known as neurons or simple processing elements, which process information in a connectionist approach. Some neural systems may be constructed so as to adapt their structure based on internal or external factors. In order to create a neural system that demonstrates reasonable behavior, the neural system must have a certain level of complexity. Ideally, that complexity is stable. However, with additional complexity come additional stability problems. In humans, additional complexity may come in the form of psychological conditions or tendencies, such as Narcissistic Entitlement Syndrome, overly perfectionist tendencies, etc. In machines, the additional complexity comes from the various subsystems and/or the interactions between the various subsystems.

An example application of a complex neural system with many subsystems could be the robotic architecture called Autonomic Nano Technology Swarm (ANTS) described at http://ants.gsfc.nasa.gov. ANTS forms a complex neural system containing many subsystems such as Lower Level Neural System that provides security and safety, a Higher Level Neural System that provides more purposeful behavior such as problem solving, planning, or scheduling, an Evolvable Neural Interface to coordinate efforts between the higher and lower level subsystems, and the skeletal/muscular system of the frame itself. Some subsystems are complex neural systems in and of themselves.

Another example application of a neural system is the artificial intelligence "game"20Q which may be found at http://www.20q.net. 20Q employs a neural system to ask 20 questions about an item and guess what the item is at the end of the question period.

Indeed, a neural network is a particular software realization of just higher or heuristic level of the Neural Basis Function Synthetic Neural System (NBF SNS) which has already been demonstrated to be capable of very rapid learning and development.

One prior approach is to create a rule-driven system, but every rule-driven system will encounter exceptions to the rules and must be made adaptive. Prior systems address increasing instability with increasing complexity are qualitative and lack the precision needed to correct unstable systems. Prior systems also provide a rigorous approach to neural system stability analysis, attempting to catalog every possible state in the neural system, which results in a prohibitively high number of states. Such systems include requirements to identify unstable interactions between elements of neural systems and to provide guidance on their correction. Accordingly, what is needed in the art is a way to quantify stability analysis of synthetic and natural neural systems.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed herein are systems, methods, and computer-readable media for determining stability of a neural system. The exemplary method embodiment includes tracking a function world line of an N element neural system within behavioral spaces, determining whether the tracking function world line is approaching a psychological stability surface, and implementing a quantitative solution that corrects instability if the tracked function world line is approaching the psychological stability surface.

The principles of the invention may be utilized to provide clear identification of causes of neural system instabilities and provide quantitative solutions to correct neural system instabilities in arbitrarily complex neural systems.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which:

FIG. 1 illustrates a basic system or computing device according to a first exemplary embodiment of the invention;

FIG. 2 illustrates a method according to a second exemplary embodiment of the invention;

FIG. 5 illustrates the behavioral function dependence on f(PSV) in an empirical example;

FIG. 6 illustrates an example neural map for a neural basis function of a synthetic neural system called Autonomous Nano Technology Swarm (ANTS); and FIG. 7 illustrates a SANE time evolution of a Psychological Stability Vector (PSV).

DETAILED DESCRIPTION

Figure 3:
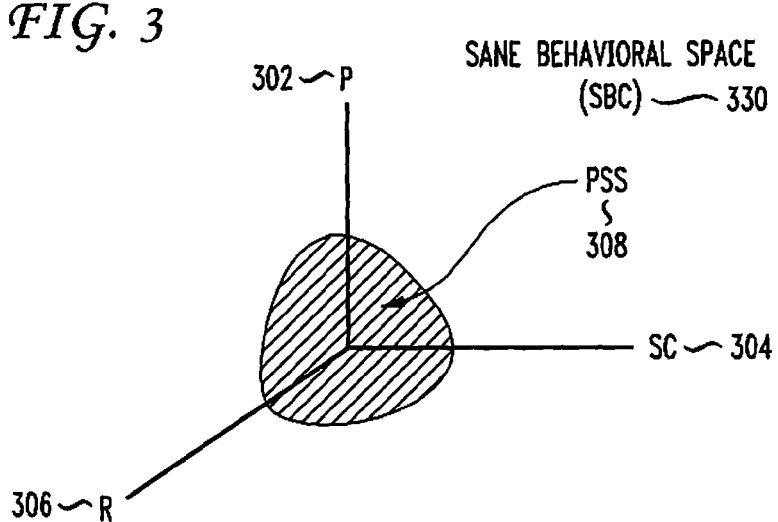
FIG. 3 illustrates a Stability Algorithm for Neural Entities (SANE) Behavioral Space (SBS)

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the system may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage device, such as a hard disk drive 160, a magnetic disk drive, an optical disk drive, tape drive, or the like. The storage device 160 is connected to the system bus 110 by a drive interface. The drives and the associated computer readable media provide non-volatile storage of computer readable instructions, data structures, program modules, and other data for the computing device 100. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream, and the like, may also be used in the exemplary operating environment.

To enable user interaction with the computing device 100, an input device 190 represents any number of input mechanisms, such as a microphone for speech, a touch sensitive screen for gesture or graphical input, keyboard, mouse, motion input, speech, and so forth. For example, the input may be used by the presenter to indicate the beginning of a speech search query. The device output 170 can also be one or more of a number of output devices. In some instances, multimodal systems enable a user to provide multiple types of input to communicate with the computing device 100. The communications interface 180 generally governs and manages the user input and system output. There is no restriction on the system operating on any particular hardware arrangement and therefore the basic features here may be substituted for improved hardware or firmware arrangements as they are developed.

For clarity of explanation, FIG. 1 illustrates the exemplary computing device 100 as including individual functional blocks (including the functional block labeled as a "processor"). The functions these blocks represent may be provided through the use of either shared or dedicated hardware, including, but not limited to, hardware capable of executing software. For example, the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

Figure 4:
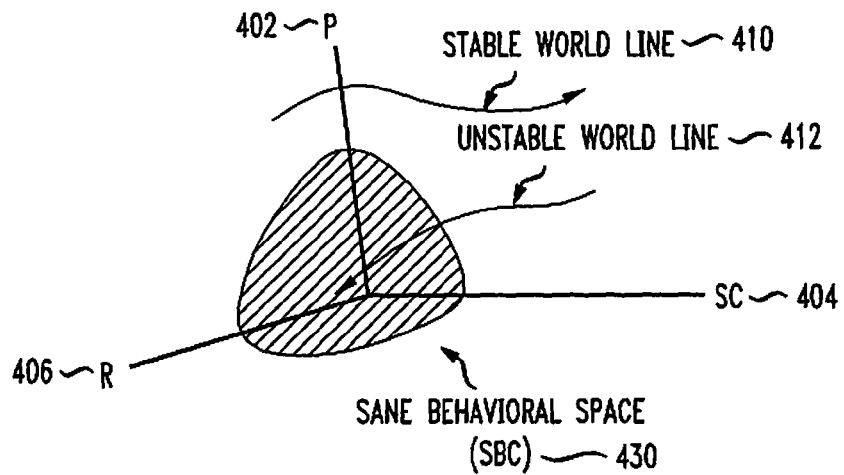
FIG. 4 illustrates stable and unstable trajectories depending on the Psychological State Vector (PSV)

FIG. 2 illustrates a method embodiment of the invention. First, the method tracks a function world line of an N element neural system within behavioral space (202). There may be one behavioral space or a plurality of behavioral spaces. A function world line is a linear representation of how a given neural system executes in a time-dependent situation. The function world line is similar to a vector in that it indicates a direction and magnitude of motion. A behavioral space is an N-dimensional space that defines the universe of available options for a neural system. For example, in FIG. 3 and FIG. 4, a 3-dimensional behavioral space is shown, the three dimensions being planning (or goal-making) (P), self-control (SC), and resilience (R). If resilience is not needed for a particular application, the behavioral space may be 2-dimensional, that is, having an axis P and an axis SC. If more factors are to be taken in to consideration for a particular application, then additional dimensions may be added. For example, if the energy cost of an action is to be taken in to consideration, then E may be added as a fourth dimension. No theoretical upper limit is placed on the number of dimensions or axes which may be used. The three dimensions listed in FIG. 3 and FIG. 4 are not limiting and may be replaced with other suitable factors for various applications. Related dimensions or axes could be collapsed or combined into one axis, if circumstances allow.

The neural system may be a natural neural system, a synthetic neural system, or a blended system including both natural and synthetic neural elements. Also, contemplated are cultivated biological neural systems.

Second, the method determines whether the tracking function world line is approaching a psychological stability surface (204). In a three-dimensional behavioral space, the psychological stability surface is the threshold above which the neural system is stable. The psychological stability surface may be depicted as a portion of a sphere intersecting the space, as in FIG. 3 and FIG. 4, but the psychological stability surface may take other regular or irregular shapes as well. For example, the psychological stability surface may be a simple plane intersecting the three axes, making an inverted pyramid shape with the tip of the pyramid at the origin of the axes. The psychological stability surface may be frustro-conical, an Isosceles triangular prism shape, or any other shape not necessarily easily mathematically describable. In certain circumstances, multiple disconnected psychological stability surfaces may exist within which the neural system is unstable. For example, a semi-spherical surface may be located at the origin and further away from the origin, a second cube-shaped surface could exist indicating a second region where the neural system may become unstable. Likewise, pockets of stable surfaces may be located within and completely surrounded by unstable regions.

The tracking function world line may include tracking changes in an N-dimensional psychological state vector. The psychological state vector may be formed by the product of a 2×N psychological matrix and a 2-dimensional psychological perturbation vector composed of external and internal perturbations to the neural system. Tracked changes in the psychological state vector may include temporal evolution changes. Third, the method implements a quantitative solution that corrects instability if the tracked function world line is approaching the psychological instability surface (206). An exemplary implementation of a quantitative solution for correcting instability is Stability Algorithm for Neural Entities, or SANE.

SANE looks for instability by examining a psychological state vector's (PSV) trajectory in behavioral space based on large magnitude terms in the time derivative of the PSV that can indicate a large negative shift of the total time derivative PSV. SANE shows that instabilities arise in natural neural systems as the consequence of terms that can produce large positive behavioral gains under certain classes of perturbations. In natural neural systems, these tendencies are the consequences of how DNA is structured to maintain fitness under a broad set of conditions, even though these tendencies may produce deleterious effects on natural neural systems in more conventional times or perturbation conditions. Synthetic neural systems allow for development of additional complexity to deal with exceptional circumstances in order to maintain fitness under a broad set of conditions, as opposed to over-optimization (large magnitude terms in the time derivatives of the PSV) that can produce collapse under some circumstances.

FIG. 3 illustrates a SANE behavioral space (SBS). The SBS 330 can be a high dimensional hyperspace, however, for most neural systems, a 3-dimensional space suffices to demonstrate stability or lack thereof. The dimensions illustrated are planning (goal formulation) (P) 302, self control (SC) 304, and resilience (R) 306. In the resulting three-dimensional space, a psychological stability surface (PSS) 308 exists, on the internal, or origin, side of which the neural system collapses. In contrast, outside of this stability surface, the system operates stably. Depending on the topology of the PSS 308, stability can be maintained as long as at least one of the dimensions (302, 304, or 306) is occupied beyond the PSS 308. As discussed above, more than three dimensions may be used, although the surface may be somewhat more difficult to visualize.

FIG. 4 illustrates stable and unstable trajectories depending on the Psychological State Vector (PSV). FIG. 4 illustrates these trajectories in the context of a SANE Behavioral Space (SBS) 430. In the resulting three-dimensional space, a Psychological Stability Surface (PSS) 408 exists, on the internal origin side of which the neural system collapses. In contrast, outside of this stability surface, the system operates stably. Depending on the topology of the PSS 408, stability can be maintained as long as at least one of the dimensions (402, 404, or 406) is occupied beyond the PSS 408. The existence of the PSS 408 may be based on observations of the collapse of natural neural systems as the behaviors decrease below a certain level.

Within this SBS 430, a given neural system executes a time-dependent world line, two example trajectories of which are the stable world line 410 and the unstable world line 412. As can be seen in the diagram, a stable world line 410 is a line that is not headed to the inside of the PSS 408, while an unstable world line 412 is one that is headed to the inside of the PSS 408 or is already inside. For a neural system with N elements, world line location, direction, and evolution are determined by an N-dimensional vector whose magnitude maps into a value on each of the behavioral axes (402, 404, 406) in the SBS 430.

One of the strengths of SANE is that a specification of the PSV is not required; only the total time derivative of the PSV is required. The total time derivative can be empirically determined from activity and responses in a given behavioral space. The time derivatives embodied in the total time derivative represent a combinatorial collection of all possible time derivatives of the psychological elements (PE) that the PSV includes. In that way, possible paths to the future are calculable and hence possible interactions are accounted for a given neural system. Thus, the cause, or perturbations to the PSV, may be separated from the effect, performance in a behavioral space, in the psychology of synthetic or natural neural systems.

The total time derivative contains a convective part (with the psychological matrix, a reactive and adaptive response to environmental perturbations both internal and external) and a partial derivative with respect to time which represents evolutionary change. In the PSV time derivative, the reactive, adaptive, and evolutionary time scales are separate. In synthetic neural systems, these time scales may be collapsed, but in order to do so, precise stability control is needed. In natural neural systems, these time scales are widely separated because the tendency for behavioral collapse due to psychological instability would be overwhelming otherwise. In synthetic neural systems, where machine performance requirements do not allow the luxury of long time scales to adapt or evolve in harsh or alien environments, collapsing the time scale may be desirable. For example, if a synthetic neural system is employed on a deep space probe where human intervention is not feasible or impossible, there is no chance for evolution or adaptation; the synthetic neural system literally has only one chance to succeed.

FIG. 5 illustrates the behavioral function dependence on f(PSV) in an empirical example, the Behavioral Function (BF) giving the collapse state characteristics inside the PSS for a given magnitude of f, f. The map to the behavior dimensions is also given. Since behaviors map in a similar manner in the SBS as shown in FIG. 3 and FIG. 4, perturbations will exhibit similar functional characteristics. For example, internal and external perturbations that can drive f, will scale similarly. The BF is a direct function of f.

FIG. 6 illustrates an example neural map for a neural basis function of a synthetic neural system called Autonomous Nano Technology Swarm (ANTS). In general, a synthetic neural system includes multiple neural basis functions (NBF) interconnected through one or more evolvable neural interfaces (ENI). The two requirements for additional NBFs are that they are stable in and of themselves and that their interactions with other NBFs do not drive the system to instability. In the SANE framework, individual NBFs may be identified with psychological elements (PE) which are the x(k) as shown in FIG. 7. As mentioned above, the three time scales relevant to SANE are reactive time scales on the scale of the applied internal and external perturbations, adaptation times on the time scales over which it takes the genetic algorithms to advance the ENI, the low level neural system, and the high level neural system, and the evolution time scales on the scale of the times needed for the genetic algorithms to evolve the core genetic codes of the low level neural system and the high level neural system.

While most synthetic neural systems generally follow the time scale ordering of a natural neural system (reactive being shorter than adaptive, which is shorter yet than evolutionary), a synthetic neural system with sufficient computational bandwidth could collapse three time scales to comparable values. With the ability to collapse multiple time scales, synthetic neural networks may achieve neural shape shifting. If a neurally shape-shifting synthetic neural system were to be embedded in a physically shape shifting mobile architecture, extremely plastic behavior would be possible. Such a neurally shape-shifting neural system must be psychologically stable to be of any use. To ensure stability, some psychological stability algorithm is needed, such as SANE.

FIG. 7 illustrates a SANE time evolution of a Psychological Stability Vector (PSV). The training sequence for a synthetic neural system follows a path similar to that of a natural neural system to which perturbations have been applied over an adaptation time scale. However, the synthetic neural system also allows intervention on an evolutionary time scale corresponding to cross-generational, aging, or maturation time scales in a natural neural system. For a natural neural system, these time scales are not accessible. However, in a synthetic neural system, SANE can be directly applied to the core genetic code which can be directly altered to attenuate psychological instabilities. This corresponds to the second terms in the equations in FIG. 7 containing explicit time partial derivatives of the x(k) of NBFs.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code implementations for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof through a communications network. In a distributed computing environment, program modules may be located in both local and remote memory storage devices.

Although the above description provides specific details, these details should not be construed as limiting the claims in any way. Other configurations of the described embodiments of the invention are part of the scope of this invention. For example, the method could be used to train complex, robust neural systems docking systems or roving robot systems. Accordingly, the appended claims and their legal equivalents should only define the invention, rather than any specific examples given.

I claim:

1. A method of maintaining stability of a neural system, the method comprising:
tracking a function world line of an N element neural system within behavioral spaces;
determining whether the tracking function world line is approaching a psychological stability surface; and
if the tracked function world line is approaching the psychological stability surface, then implementing a quantitative solution that prevents instability by ensuring said tracked function world line does not intersect said psychological stability surface thereby maintaining stability of said neural system;
wherein tracking the function world line further comprises tracking changes in an N dimensional psychological state vector (PSV).

2. The method of claim 1, wherein the neural system is one of a natural and a synthetic neural system.

3. A method of determining stability of a neural system, the method comprising:
tracking a function world line of an N element neural system within behavioral spaces;
determining whether the tracking function world line is approaching a psychological stability surface; and
if the tracked function world line is approaching the psychological stability surface, then implementing a quantitative solution that corrects instability, wherein the behavioral space is a 3 dimensional space comprising a planning axis, a self control axis and a resilience axis.

4. A non-transitory computer-readable medium storing a computer program having instructions for maintaining stability of a neural system, the instructions comprising:
tracking a function world line of an N element neural system within behavioral spaces;
determining whether the tracking function world line is approaching a psychological stability surface; and
if the tracked function world line is approaching the psychological stability surface, then implementing a quantitative solution that prevents instability by ensuring said tracked function world line does not intersect said psychological stability surface thereby maintaining stability of said neural system;
wherein tracking the function world line further comprises tracking changes in an N dimensional psychological state vector (PSV).

5. The computer-readable medium of claim 4, wherein the neural system is one of a natural and a synthetic neural system.

6. A non-transitory computer-readable medium storing a computer program having instructions for determining stability of a neural system, the instructions comprising:
tracking a function world line of an N element neural system within behavioral spaces;
determining whether the tracking function world line is approaching a psychological stability surface; and
if the tracked function world line is approaching the psychological stability surface, then implementing a quantitative solution that corrects instability, wherein the behavioral space is a 3 dimensional space comprising a planning axis, a self control axis and a resilience axis.

* * * * *